(12) United States Patent  
Singh et al.

(10) Patent No.: US 9,370,025 B1  
(45) Date of Patent: Jun. 14, 2016

(54) CONTENTION FREE PREAMBLE REUSE BASED ON LATENCY METRICS

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Austin, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 16 days.

(21) Appl. No.: 14/301,383

(22) Filed: Jun. 11, 2014

(51) Int. Cl.
*H04W 36/08* (2009.01)
*H04W 74/08* (2009.01)

(52) U.S. Cl.
CPC .......... *H04W 74/0841* (2013.01); *H04W 36/08* (2013.01)

(58) Field of Classification Search
None
See application file for complete search history.

(56) References Cited

U.S. PATENT DOCUMENTS

| 2008/0318578 | A1 | 12/2008 | Worrall | |
|---|---|---|---|---|
| 2010/0285809 | A1* | 11/2010 | Lindstrom | H04L 5/001 455/450 |
| 2013/0294382 | A1* | 11/2013 | Xu | H04W 76/066 370/329 |
| 2014/0334389 | A1* | 11/2014 | Abdel-Samad | H04W 76/021 370/329 |

OTHER PUBLICATIONS

"LTE Air Interface and Protocols & Procedures," Ericsson Student Book LND 108 7401 R11A (2010) (465 pages).
H. Holma and A. Toskala, "LTE for UMTS OFDMA and SC-FDMA Based Radio Access" (2009) (450 pages).

* cited by examiner

*Primary Examiner* — Omar Ghowrwal

(57) ABSTRACT

A base station is configured for latency-based contention free preamble reuse. The base station determines the latency between it and each of a plurality of neighboring stations and, in response to receiving two different handover requests for two different UEs from two different neighboring base stations, the base station assigns one contention free preamble for use by both of the two UEs based at least in part on respective latencies from the base station to each of the two different neighboring base stations.

20 Claims, 4 Drawing Sheets

CONTENTION FREE PREAMBLE REUSE BASED ON LATENCY METRICS

BACKGROUND

Unless otherwise indicated herein, the materials described in this section are not prior art to the claims and are not admitted to be prior art by inclusion in this section.

Cellular wireless networks typically include a number of base stations that radiate to define wireless coverage areas, such as cells and/or cell sectors, in which user equipment devices (UEs) (also known as wireless communication devices (WCDs)) such as cell phones, "smart" phones, tablet computers, tracking devices, embedded wireless modules, and other wirelessly equipped communication devices, can operate. Each base station is coupled to network infrastructure that provides connectivity with one or more transport networks, such as the public switched telephone network (PSTN) for voice communications and/or the Internet for voice and/or data communications. With this arrangement, a UE within coverage area of the wireless network may engage in air interface communication with a base station and may thereby communicate via the base station with various remote network entities or with other UEs served by the base station.

In general, a wireless network operates in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol defines its own procedures for registration of UEs, initiation of communications, handoff/handover between coverage areas, and functions related to air interface communication.

OVERVIEW

This overview is illustrative only and is not intended to be limiting. In addition to the illustrative aspects, embodiments, and features described herein, further aspects, embodiments, and features will become apparent by reference to the figures and the following detailed description.

In a wireless network, the uplink or reverse link air interface supports random access by UEs, through which UEs that are not yet active/connected with a base station can request registration, attachment, or the like. This is referred to as "random" access, since a UE can randomly select an uplink access resource to use, without having previously been assigned a particular uplink access resource by the base station. An issue with such an arrangement, however, is that two or more UEs may by chance transmit using the same access resource, which would cause an access collision and a failure of access communication to the base station.

For example, in CDMA, the uplink (reverse link) includes an access channel that is divided into timeslots. In operation, a UE randomly selects one of those timeslots in which to transmit an "access probe" to the base station. It is possible that two or more UEs may by chance transmit access probes in the same timeslot, in which case neither access probe from either UE would successfully reach the base station. Similarly, in LTE, the uplink includes an access channel in which UEs can transmit unique "access preambles." The preambles are defined so that an LTE base station (i.e., an eNodeB) is able to use code differentiation (e.g., code division demultiplexing) to resolve concurrently received messages with different access preambles. However, it is possible that two or more UEs may transmit access requests with the same access preamble (at the same time), in which case the base station is unlikely to successfully receive either UE's transmission. When this happens, both UEs will need to re-transmit their access requests, thus ultimately delaying the access process and possibly further burdening the air interface access resources.

LTE provides for "contention free preambles" to avoid such collision issues. For example, for important communications and/or where a base station knows that a UE is going to be requesting access, a base station can assign to the UE a particular contention free preamble that no other UE would be allowed to use for the time period at issue. The UE can then send its access request with the assigned contention free preamble without experiencing a collision caused by another UE transmitting an access request at the same time using the same preamble. However, an LTE base station typically has a limited number of contention free preambles that can be assigned to UEs for this purpose. Most of the preambles are available for random use by any UE, and are therefore not contention free.

In operation, when a UE is going to hand over from its serving base station (source base station) to another base station (target base station), the source base station engages in signaling with the target base station via an inter-base station communication link. In LTE, the link is referred to as the X2 interface. Through signaling over the inter-base station communication link, the source base station sends a handover request to the target base station, the target base station reserves resources (and/or perhaps takes other action to prepare for the handover), and the target base station responds to the source base station with an approval of the handover request. The source base station then instructs the UE to transition to be served by the target base station.

As part of the transition from being served by the source base station to being served by the target base station, and after the source base station has instructed the UE to transition to the target base station, the UE sends an access request comprising an access preamble to the target base station to request access to the target base station. As described above, if the UE uses a non-contention free preamble, then there is a possibility that another UE will use that same non-contention free preamble at the same time, thereby causing a collision. In the case of such a collision, the target base station is unlikely to receive either of the access requests.

However, in some networks, as part of the handover process, the target base station can assign the transitioning UE a contention free preamble to use for its access request to facilitate the handover from the source base station to the target base station. In operation, the target base station assigns one of its limited number of contention free preambles to the UE, and specifies that assigned contention free preamble in a signaling message sent from the target base station to the source base station via the inter-base station link between the target and source base stations. The source base station then instructs the UE to use the assigned contention free preamble for the access request that the UE will send to the target base station. Absent some malfunction in the network, using the contention free preamble ensures that the target base station will receive the transitioning UE's access request, or at least substantially increases the likelihood that the target base station will receive the transitioning UE's access request as compared to using a non-contention free preamble.

There are a finite number of preambles that can be used by UEs to request access from a base station. Of this finite number of preambles, some are designated as contention free preambles and the rest are designated as non-contention free preambles. Thus, every preamble designated for contention free use reduces the number of preambles available for non-contention free use. Reducing the number of preambles available for non-contention free use increases the likelihood that UEs configured to use those non-contention free preambles will experience collisions, because, if there are fewer non-contention free preambles to use, then it is more likely that two UEs will use the same non-contention free preamble at the same time. Therefore, in an operational network, it is typically desirable to use as few contention-free preambles as possible.

One way to reduce the number of contention free preambles used by a base station is by reusing contention free preambles based on inter-base station signaling latency. In one example, an LTE base station (i.e., an eNodeB) evaluates the latency of its inter-base station link (X2 interface) respectively with each of various neighboring base stations, such as through pinging or similar latency measurements, and the base station will assign contention free preambles to UEs based on the determined latencies. In some embodiments, based on the latency evaluation, the base station will then identify two neighboring base stations that have sufficiently different levels of inter-base station latency (e.g., sufficiently different X2 latency). For example, the base station will select two neighboring base stations having a difference in latency that is greater than or equal to a latency difference threshold. Then, when the base station receives substantially concurrent handover requests for two different UEs from those two neighboring base stations, the base station will assign to the two different UEs the same contention free preamble to use for sending their separate access requests.

In operation, the difference in inter-base station latency will cause the assigned contention free preamble to reach the source neighbor base stations at different enough times, thus causing the assigned contention free preamble to reach the two different UEs at different enough times. When each UE receives the assigned contention free preamble, each UE is able to send an access request to the target base station using the assigned contention free preamble. But because the two UEs receive the assigned contention free preamble at different times, the UEs do not send their access requests with the contention free preamble to the target base station at the same time, thus avoiding an access collision. Advantageously, the latency-based contention free preamble assignment scheme helps conserve the target base station's limited supply of contention free access preambles.

DETAILED DESCRIPTION

Figure 1:
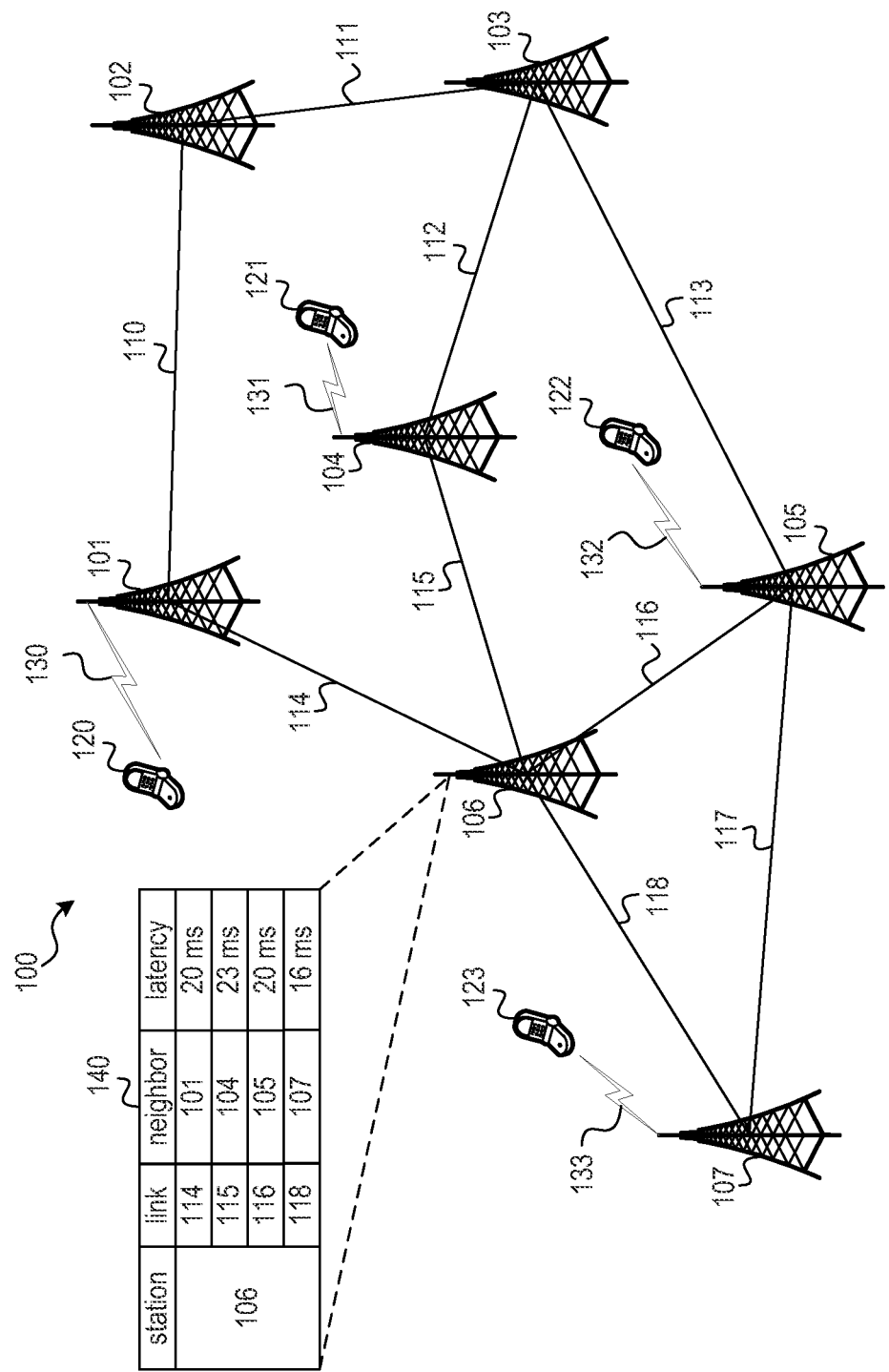
FIG. 1 is a simplified network diagram of an example wireless communications network according to some embodiments of the disclosed systems and methods.

FIG. 1 is a simplified network diagram of an example wireless communications network according to some embodiments of the disclosed systems and methods. However, this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the features and functions described herein.

The example wireless communication network 100 shown in FIG. 1 includes a plurality of base stations 101-107. Each base station includes one or more base transceiver stations (BTSs), access nodes, node-Bs, eNodeBs (eNBs), and/or other supporting network infrastructure. In the example shown in FIG. 1, the wireless network is an LTE network and each of the plurality of base stations 101-107 is an LTE eNodeB. However, in other embodiments, the wireless network may operate according to other wireless protocols.

Each base station is connected to one or more neighboring base stations via communication links 110-118. For example, in FIG. 1, base station 106 is connected to neighbor base stations 101, 104, 105, and 107 via communications links 114, 115, 116, and 118, respectively. Similarly, base station 105 is connected to neighbor base stations 103, 106, and 107 via communication links 113, 116, and 117, respectively. In operation, the communication links 110-118 are configured to facilitate the transmission of at least signaling information (e.g., packets corresponding to signaling messages) between base stations. In some embodiments, some (or perhaps all) of the communications links may additionally be configured to facilitate the transmission of bearer traffic (e.g., packets corresponding to phone calls and data transmissions). Also, each communication link may be a physical communication link or a logical communication link (formed from one or more underlying physical communication links). Thus, each base station's neighboring base stations may include both (i) physically-adjacent base stations and (ii) logically-adjacent base stations. In LTE embodiments, for example, the base stations are connected to one another via a packet-switched network, and the communication links 110-118 represent logical connections between the base stations 101-107.

Each of the plurality of base stations 101-107 is configured to provide wireless communications to user equipment devices (UEs) via one or more wireless communications links. For example, FIG. 1 shows base station 101 providing wireless communications over wireless link 130 to UE 120, base station 104 providing wireless communications over wireless link 131 to UE 121, and base station 107 providing wireless communications over wireless link 133 to UE 123.

In operation, each base station evaluates the latency between it and each of its neighboring base stations. For example, base station 106 has four neighboring base stations: base station 101, base station 104, base station 105, and base station 107. Neighbor base station 101 is connected to base station 106 via communication link 114, neighbor base station 104 is connected to base station 106 via communication link 115, neighbor base station 105 is connected to base station 106 via communication link 116, and neighbor base station 107 is connected to base station 106 via communication link 118. Thus, to determine a respective latency from base station 106 to each of its neighboring base stations 101, 104, 105, and 107, base station 106 determines the latency for each of communication links 114, 115, 116, and 118, respectively.

In some embodiments, an individual base station may evaluate the latency between it and a neighboring base station by sending a latency measurement message comprising a transmission timestamp to the neighboring base station. When the neighboring base station receives the latency measurement message, the neighboring base station subtracts the time indicated in the transmission timestamp from the time that it received the latency measurement massage to determine the one-way latency of the communication link from the individual base station to the neighboring base station. The neighboring base station may then report the one-way latency measurement back to the individual base station that sent the original latency measurement message, after which point, the individual base station and the neighboring base station both know the latency of the communications link from the individual base station to the neighboring base station. If every base station in the network performs the above-described latency-determination procedure with each of its neighboring base stations, then every base station can build a latency table corresponding to the one-way latency between it and each of its neighboring base stations. Thus, for two adjacent base stations, each base station knows the one-way latency between it and the other base station. And if it is desirable for the adjacent base stations to know the two-way (bidirectional) latency between themselves, then each of the two adjacent base stations can simply share their one-way latency measurements with each other.

In other embodiments, an individual base station may evaluate the latency between it and a neighboring base station by sending a ping message (i.e. an Internet Control Message Protocol (ICMP) echo request message or the like) to the neighboring base station, which will in turn send a response (i.e., an ICMP echo reply or the like) back to the individual base station. The individual base station can then determine the round-trip latency on the communication link between it and the neighboring base station by comparing the time that it sent the ping message to the neighboring base station and the time that it received the response from the neighboring base station. If it is desirable for the individual base station to use a one-way latency for subsequent aspects of the methods described herein, then the individual base station can simply divide the round-trip latency in half to get a reasonable approximation of the one-way latency from itself to the neighboring base station.

In some embodiments, each base station may perform the latency determination function on a regular basis to update its latency table (or similar latency tracking mechanism).

In some embodiments, because transmission distance is typically the most significant factor for inter-node latency, the latency could be determined by a network engineer (or other system operator) and entered into a lookup table (e.g., via configuration settings) at the base station such that, when the base station needs to determine the latency between it and a neighboring base station, the base station need only access the latency value stored in the lookup table. Of course, other methods of determining one-way and/or two-way latency could be used as well.

Regardless of the particular latency-determination method employed, each base station associates each neighboring base station with that neighboring base station's corresponding latency. In some embodiments, the association between each neighboring base station and is corresponding latency is implemented with a latency table. For example, latency table 140 corresponds to the one-way latency between base station 106 and each of its neighboring base stations 101, 104, 105, and 107. In particular, the one-way latency from base station 106 to neighboring base station 101 via link 114 is 20 ms, the one-way latency from base station 106 to neighboring base station 104 via link 115 is 23 ms, the one-way latency from base station 106 to neighboring base station 105 via link 116 is 20 ms, and the one-way latency from base station 106 to neighboring base station 107 via link 118 is 16 ms. In operation, each of the base stations 101-107 has a similar latency table (not shown) that associates each of its neighboring base stations with a corresponding latency.

In some embodiments, each base station's latency table (or similar latency association mechanism) may include both (i) all of the base station's directly adjacent neighboring nodes, and (ii) one or more base stations that are adjacent to its neighboring nodes. For example, latency table 140 for base station 106 may additionally include an associated latency for base station 102 and/or base station 103 even though base stations 102 and 103 do not have direct communication links with base station 106. In some embodiments, any two base stations that are likely to hand over UEs to each other should have a direct communication link. However, if for example base station 106 and base station 102 are likely to hand over UEs to each other even though they are not directly connected by a signaling link, they may still exchange signaling information to facilitate handover between each other by exchanging inter-base station signaling messages with each other via intermediate base station 101. In such a configuration, the latency table 140 (or similar latency association mechanism) of base station 106 would have an additional entry for "neighbor" base station 102 that would correspond to the sum of (i) the latency from base station 106 to base station 101 via link 114 and (ii) the latency from base station 101 to base station 102 via link 110. In this arrangement, base station 102 might still be considered a neighboring base station to base station 106 even though base station 106 and base station 102 do not have a direct physical or logical signaling link in the example shown in FIG. 1.

In LTE embodiments where the plurality of base stations are connected by a packet-switched network, a particular base station's latency table may include associated latency measurements for every base station that the particular base station is likely to receive handover requests from. In such embodiments, the set of neighboring base stations in the particular base station's latency table (or similar latency association mechanism) may be learned by the particular base station as the particular base station receives handover requests from other base stations. In operation, when the base station receives a handover request from another base station, the base station can add the other base station (from which it received the handover request) to its neighboring base station list and revise its latency table accordingly.

In some embodiments, once a base station has associated each of its neighboring base stations with a corresponding latency, the base station may select two base stations (from the set of neighboring base stations) whose corresponding latency measurements are greater than (or greater than or equal to) a latency difference threshold. In particular, the base station selects (from the set of neighboring base stations) a first neighboring base station and a second neighboring base station, based on the difference between the latency associated with the first base station and the latency associated with the second base station being greater than (or greater than or equal to) a latency difference threshold.

Alternatively, in some embodiments, a network engineer (or similar system operator) may select two neighboring base stations as the first and second neighboring base stations the base station to use for latency-based contention free preamble reuse because those two neighboring base stations have corresponding associated latencies that differ by more than the latency difference threshold. The network engineer may then configure the base station with the selected first and second neighboring base stations. However, because latency may vary as a function of congestion and possibly other factors, in preferred embodiments, the base station determines the latency between itself and each of its neighboring base stations and selects one or more pairs of neighboring base stations for contention free preamble reuse according to the methods described herein.

Inter-base station latency may change over time because of changes in traffic loads, traffic patterns, or network configurations. Therefore, in some embodiments, certain functions may be performed periodically (or at least on a regular basis). For example, in some embodiments, the latency determination for each corresponding neighbor node and subsequent selection of a pair of neighboring nodes for contention free preamble reuse may be performed on a regular basis. In some embodiments, these steps may be performed every few seconds. However, in other embodiments, these steps may be performed every few minutes, hours, days, months, etc. In some embodiments, these steps may be performed in response to specific and/or significant changes in measured network traffic (for example, after network traffic measurements indicate a change in network congestion and likely latency) and/or changes in network configuration, for example, after implementing new inter-base station communication links or reconfiguring existing inter-base station communication links. In LTE embodiments where base stations communicate with each other over a packet-switched network, changes in the underlying transmission network that support the packet-switched network may result in changes to inter-base station latency that might cause a base station to reassess the latency from itself to each of its neighboring base stations.

Figure 2:
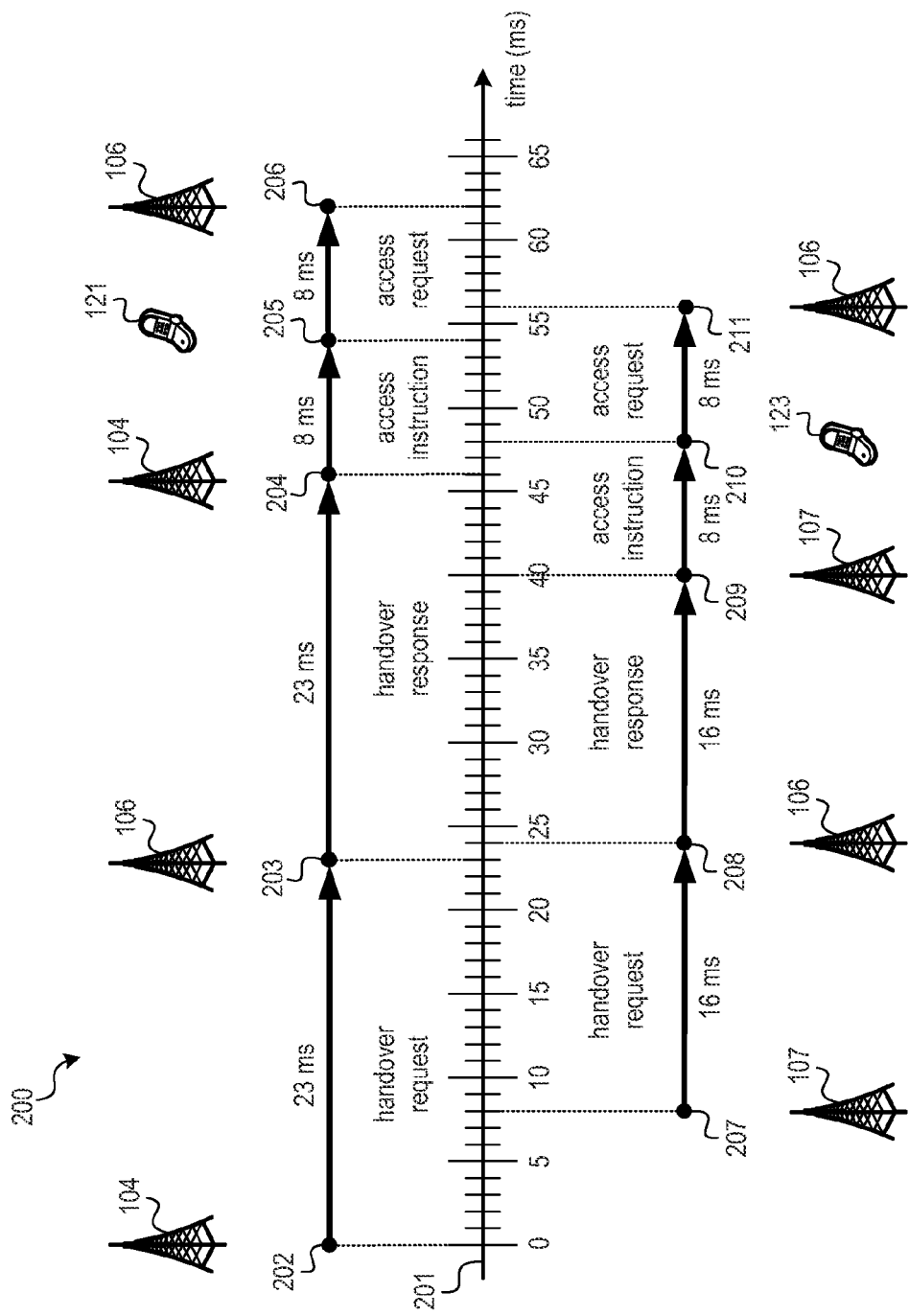
FIG. 2 is an example simplified timing diagram depicting the timing of signaling messages utilized by some embodiments of the disclosed systems and methods.

FIG. 2 is a simplified timing diagram 200 depicting an example of signaling messages for some embodiments of the disclosed systems and methods. In particular, timing diagram 200 shows the timing of example signaling messages between base stations 104, 106, and 107 (also shown in FIG. 1) in relation to two handovers: (1) a first handover of UE 121 from base station 104 to base station 106 and (2) a second handover of UE 123 from base station 107 to base station 106. Timeline 201 starts at 0 ms as a reference point and advances in time toward the right. Timeline 201 includes one mark for every millisecond and includes a label for every 5 ms increment.

The timing of the signaling messages correspond in part to the inter-base station signaling latency identified in latency table 140 (FIG. 1), which shows the latency between base station 106 and each of its neighboring base stations, including base stations 104 and 107 shown in FIG. 2. In particular, and referring back to table 140 of FIG. 1, the latency between base station 106 and 104 is 23 ms, and the latency between base station 106 and base station 107 is 16 ms.

FIG. 2 assumes that base station 106 has been configured with a latency difference threshold of 6 ms such that the difference between the latency associated with neighboring base station 104 and the latency associated with base station 107 (i.e., 23 ms-16 ms=7 ms) is greater than or equal to base station 106's latency difference threshold of 6 ms. The latency difference threshold of 6 ms is used here for illustrative purposes only. In operation, the latency difference threshold could be anywhere from a few milliseconds to tens of milliseconds. In some embodiments, the latency difference threshold is a configurable parameter of the base station that may be set by a network engineer or similar system operator. Further, in some embodiments, the latency threshold may be individually configurable on each base station such that different base stations could have different latency difference thresholds. But in other embodiments, the latency threshold may be configurable on a network or network segment/region basis such that every base station in a particular network or network segment/region has the same latency difference threshold.

Some embodiments may not rely on a specific latency difference threshold, but instead, may rely upon differences between arrival times of handover requests from neighboring base stations in relation to corresponding latencies of the neighboring base stations, as described in more detail herein.

FIG. 2 further assumes that (i) the latency from base station 106 to base station 104 is equal to the latency from base station 104 to base station 106 and (ii) the latency from base station 107 to base station 106 is equal to the latency from base station 106 to base station 107. However, in operation, the latency may not necessarily be identical in both directions and the systems and methods disclosed herein neither require nor preclude latency to be identical in both directions on a link.

For illustration purposes, the signaling between base station 106, base station 104, and UE 121 is shown above timeline 201, and the signaling between base station 106, base station 107, and UE 123 is shown below timeline 201. Likewise, the functional names of the signaling messages shown in FIG. 2 are for illustration purposes only. In operation, the signaling messages for any particular protocol may use a different nomenclature but nevertheless perform the same (or a similar) signaling function(s).

At point 202, corresponding to 0 ms on timeline 201, base station 104 sends a handover request message (or similar) associated with a handover of UE 121 to base station 106. Because the latency between base station 104 and base station 106 is 23 ms (based on latency table 140 in FIG. 1), base station 106 does not receive the handover request from base station 104 until point 203 on timeline 201, corresponding to 23 ms.

At point 203, and in response to receiving the handover request for UE 121 from base station 104, base station 106 (i) assigns a contention free preamble for UE 121 to use when UE 121 later sends an access request to base station 106, and (ii) sends a handover response message (or similar) back to base station 104. In operation, the handover response that base station 106 sends to base station 104 includes the contention free preamble (or perhaps an indication of the contention free preamble, e.g., an index number corresponding to the contention free preamble) that the UE 121 will need to use when UE 121 later sends its access request to base station 106. Because the latency between base station 106 and base station 104 is 23 ms, base station 104 does not receive the handover response from base station 106 containing the contention free preamble (or the indication thereof) until point 204, corresponding to 46 ms on timeline 201.

After receiving the handover response from base station 106, base station 104 sends UE 121 a message with access instructions indicating that (i) base station 104 will be handing over UE 121 to base station 106, and (ii) UE 121 should use the assigned contention free preamble to send its access request to base station 106. In some embodiments, the access instruction message that base station 104 sends to UE 121 includes the contention free preamble that UE 121 should use for its access request to base station 106. In other embodiments, the access instruction message that base station 104 sends to UE 121 may include an index (or other similar identifier) that indicates to UE 121 the contention free preamble assigned by base station 106.

For illustration purposes, timeline 201 shows air interface latency on the downlink from base station 104 to UE 121 as 8 ms and the latency on the uplink from UE 121 to base station 106 also as 8 ms. In operation, the actual latency on the downlink from base station 104 to UE 121 will depend primarily on the distance that UE 121 is from base station 104, and the actual latency on the uplink from UE 121 to base station 106 will depend primarily on the distance that UE 121 is from base station 106. The latency on the uplink and downlink may also depend in part on the traffic loading on the link, including signaling and/or bearer traffic, depending on the implementation.

Nevertheless, at point 205, corresponding to 54 ms on timeline 201 (based on the 8 ms downlink latency assumption), UE 121 receives (from base station 104) the contention free preamble (or perhaps simply an indication thereof) that base station 106 assigned for UE 121 to use when UE 121 sends its access request to base station 106. And in response, UE 121 sends an access request comprising the assigned contention free preamble to base station 106. Finally, at point 206, corresponding to 62 ms on timeline 201 (based on the 8 ms uplink latency assumption), base station 106 receives the access request comprising the assigned contention free preamble from UE 121.

Meanwhile, while base station 104 has been handing over UE 121 to base station 106, base station 107 is also in the process of initiating a handover of UE 123 to base station 106. In particular, at point 207, corresponding to 8 ms (selected for illustration purposes only) on timeline 201, base station 107 sends a handover request message to base station 106. Because the latency between base station 107 and 106 is 16 ms (based on latency table 140 from FIG. 1), base station 106 does not receive the handover request from base station 107 until point 208, corresponding to 24 ms on timeline 201. Recall from the handover of UE 121 from base station 104 to base station 106 that base station 106 received the handover request message from base station 104 at point 203, corresponding to 23 ms on timeline 201. Thus, base station 106 received the handover request from base station 107 only 1 ms after receiving the handover request from base station 104. As a result, in the example shown in FIG. 2, the handover request receipt difference corresponding to the difference between the time that base station 106 received the handover request for UE 121 from base station 104 and the time that base station 106 received the handover request for UE 123 from base station 107 is 1 ms (i.e. 24 ms−23 ms=1 ms).

In the example shown in FIG. 2, the difference between the arrival time of the first and second handover requests received from base stations 104 and 107 (i.e. 1 ms) is less than the difference between the respective latencies for base stations 104 and 107 (i.e., 7 ms). As a result, base station 106 may assign the same contention free preamble to UE 123 at point 208 (corresponding to 24 ms on timeline 201) that it previously assigned to UE 121 at point 203 (corresponding to 23 ms on time 201). Because the difference between the arrival times of the two handover requests is sufficiently less than the difference between the latencies to the two different neighboring base stations that originated the two handover requests, the handover approvals from base station 106 arrive at the originating neighboring base stations 104, 107 sufficiently far apart in time. Thus, the two UEs receive their handover instructions with the contention free preamble from the two neighboring base stations at sufficiently different times, which results in the first of the two UEs sending its access request comprising the assigned contention free preamble at a time that is different than the time that the second of the two UEs sends its access request comprising that same assigned contention free preamble, thereby causing the target base station (i.e., base station 106 in this example), to receive the two different access requests comprising the same contention free preamble from the two different UEs at different times and thus without collision.

Rather than considering relative differences between handover request arrival times and neighbor node latencies, some embodiments may instead implement a handover request receipt difference threshold. In operation, such embodiments consider whether the difference between the time that the target base station receives a first handover request for a first UE from a first neighboring base station and the time the target base station receives a second handover request for a second UE from a second neighboring base station is less than (or less than or equal to) a handover request receipt difference threshold (or simply a "receipt difference threshold"). In operation, the receipt difference threshold may be any value between 0 ms and tens of milliseconds. Typically, however, a receipt difference threshold for a particular pair of neighboring base stations should be less than the latency difference for that particular pair of base stations.

In some embodiments that implement a receipt difference threshold, the receipt difference threshold is a configurable parameter of the base station that may be set by a network engineer or similar system operator. Further, in some embodiments, the receipt difference threshold may be individually configurable on each base station such that different base stations could have different receipt difference thresholds. But in other embodiments, the receipt difference threshold may be configurable on a network or network segment/region basis such that every base station in a particular network or network segment/region has the same receipt difference threshold. In still further embodiments, the receipt difference threshold may be based on the latency difference threshold (for embodiments that rely upon a latency difference threshold), or perhaps even on the measured or determined difference in latency between the two neighboring base stations selected as a pair of neighboring base stations with which a target base station will implement latency-based contention free preamble reuse. For example, the receipt difference threshold may be proportional to the latency difference threshold (or the actual measured or determined latency difference), such that a higher latency difference threshold (or a longer actual latency difference) enables the base station to use a larger receipt difference threshold, whereas a lower latency difference threshold (or a shorter actual latency difference) may require the base station to use a smaller receipt difference threshold.

Referring back to the example in FIG. 2, regardless of the particular implementation, because the difference in latency associated with base stations 104 and 107 relative to base station 106 is sufficiently great, there is a very low risk that UE 121 and UE 123 will both use the assigned contention free preamble at the same time when they later send their separate access requests to base station 106. And indeed, in the example shown in FIG. 2, UE 121 and UE 123 do not both use the assigned contention free preamble at the same time.

In particular, at point 208 (corresponding to 24 ms on timeline 201), base station 106 (i) assigns the same contention free preamble for UE 123 that it previously assigned at point 203 (23 ms) for UE 121 to use when UE 123 later sends an access request to base station 106, and (ii) sends a handover response message (or similar) back to base station 107. In operation, the handover response that base station 106 sends to base station 107 includes the contention free preamble (or perhaps an indication of the contention free preamble, e.g., an index number corresponding to the contention free preamble) that the UE 123 will need to use when UE 123 later sends its access request to base station 106. Because the latency between base station 106 and base station 107 is 16 ms, base station 107 receives the handover response from base station 106 containing the contention free preamble (or the indication thereof) at point 209, corresponding to 40 ms on timeline 201.

After receiving the handover response from base station 106, base station 107 sends UE 123 an access instruction message indicating that (i) base station 107 will be handing over UE 123 to base station 106, and (ii) UE 123 should use the assigned contention free preamble to send its access request to base station 106. In some embodiments, the access instruction message that base station 107 sends to UE 123 includes the contention free preamble that UE 123 should use for its access request to base station 106. In other embodiments, the access instruction message that base station 107 sends to UE 123 may include an index (or other similar identifier) that indicates to UE 123 the contention free preamble assigned by base station 106.

For illustration purposes, timeline 201 shows air interface latency on the downlink from base station 107 to UE 123 as 8 ms and the latency on the uplink from UE 123 to base station 106 also as 8 ms. In operation, the actual latency on the downlink from base station 107 to UE 123 and the uplink from UE 123 to base station 106 will depend on multiple factors, including, e.g., the distance that UE 123 is from base stations 106 and 107 and traffic loading on the link, including perhaps signaling and/or bearer traffic, depending on the implementation.

Nevertheless, at point 210, corresponding to 48 ms (based on the 8 ms downlink latency assumption), UE 123 receives (from base station 107) the access instruction message comprising the contention free preamble (or perhaps simply an indication thereof) that base station 106 assigned for UE 123 to use when UE 123 sends its access request to base station 106, which as indicated previously, is the exact same contention free preamble that base station 106 assigned for UE 121 to use for its access request. In response, UE 123 sends an access request comprising the assigned contention free preamble to base station 106. And at point 211, corresponding to 56 ms (based on the 8 ms uplink latency assumption), base station 106 receives the access request comprising the assigned contention free preamble from UE 123.

With this example, even though UE 121 and UE 123 used the exact same contention free preamble for their corresponding access requests to base station 106, base station 106 received the access requests from UE 121 and UE 123 at different times (i.e., point 211 for UE 123 (corresponding to 56 ms on timeline 201) and point 206 for UE 121 (corresponding to 62 ms on timeline 201)), because of the latency differential between communication link 118 (FIG. 1) carrying the signaling messages between base stations 106 and 107 and the latency of communication link 115 (FIG. 1) carrying the signaling messages between base station 106 and 104.

As a result of the specific contention free preamble reuse described in the example of FIG. 2, base station 106 uses one less contention free preamble to facilitate the handovers for UEs 121 and 123 than it would have used without the ability to reuse contention free preambles as described herein. In operation, a base station according to the disclosed embodiments could implement latency-based contention free preamble reuse for multiple pairs of neighboring base stations. In theory, the latency-based contention free preamble reuse described herein could reduce the number of contention free preambles that a base station must set aside for contention free use by up to 50%. In particular, because the base station can use the same contention free preamble for two UEs at one time, the base station can potentially accommodate concurrent handover requests requiring contention free access from twice as many UEs as it could have accommodated if it were not able to reuse contention free preambles based on neighboring base station latency metrics as described herein.

Figure 3A:
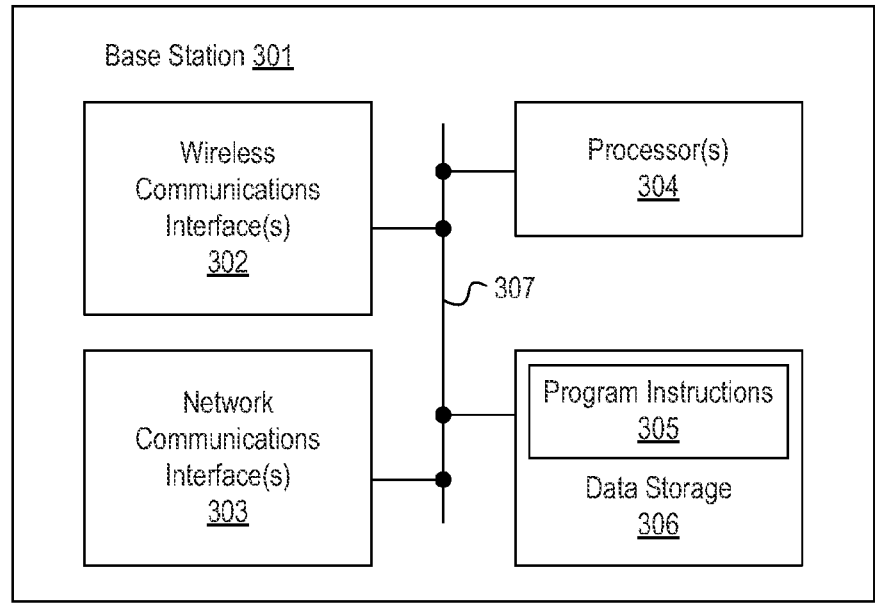
FIG. 3A is a simplified block diagram of an example base station according to some embodiments of the disclosed systems and methods.

FIG. 3A is a simplified block diagram of an example base station 201 according to some embodiments of the disclosed systems and methods, including, for example, base stations 101-107 of FIGS. 1 and 2.

The example base station 301 includes one or more wireless communications interfaces 302, one or more network communications interfaces 303, one or more processors 304, and data storage 306, all of which may be coupled together by a system bus 307 or similar mechanism. In addition, the base station 301 may also include external storage, such as magnetic or optical disk storage (not shown). Variations from this arrangement are possible as well, including addition and/or omission of components, combination of components, and distribution of components in any of a variety of ways.

The base station components may be arranged to support wireless communications in a wireless communication network that is compliant with one or more of the variety of wireless air-interface protocols disclosed herein, such as wireless network 100 shown in FIG. 1, in addition to other protocols now known or later developed. In particular, the components of the example wireless base station 301 are configured to support latency-based contention free preamble reuse, in accordance with the example embodiments described herein.

The one or more wireless communications interfaces 302 may include one or more transceivers, amplifiers, antennas, and associated components that enable the base station 301 to engage in air interface communication with one or more wireless communications devices, such as UEs 121-123 shown in FIGS. 1 and 2, according to any of the air interface protocols described herein (e.g., CDMA, GSM, LTE, etc.). In operation, the one or more wireless communications interfaces 302 support transmissions on both (1) the downlink (or forward link) from the base station 301 to a wireless communications device) and (2) the uplink (or reverse link) from the wireless communications device to the base station 301).

The one or more network interfaces 303 include physical network interfaces (e.g., optical, electrical, etc.) that enable the base station 301 to send and receive traffic directly or indirectly to/from other networks, such as the Public Switched Telephone Network (PSTN), the Internet, or other networks. The one or more network interfaces 303 also include communication interfaces/ports for inter-base station communication links, such as communication links 110-118 shown in FIG. 1. As such, the one or more network interfaces 303 may take the form of Ethernet network interface cards/ports, optical network interface cards/ports or other physical interfaces to one or more transmission networks that directly or indirectly connect the base station 301 to its neighboring base stations as well as to the PSTN, the Internet, and/or other networks.

The one or more processors 304 comprise one or more general-purpose processors (e.g., microprocessors) and/or one or more special-purpose processors (e.g., dedicated digital signal processors (DSPs), application specific integrated circuits (ASICs), etc.). The non-transitory data storage 306 comprises one or more volatile and/or non-volatile storage components, such as magnetic or optical memory or disk storage. Non-transitory data storage 306 can be integrated in whole or in part with the one or more processors 304, as cache memory or registers for instance. As further shown, non-transitory data storage 306 is equipped to hold program instructions 305. In some embodiments, one or more of the processors 304 and non-transitory data storage 306 may be integrated in whole or in part with one or more of the wireless communications interfaces 302 and/or network communications interfaces 303.

The program instructions 305 comprise machine language instructions that define routines and software program code executable by the one or more processors 304 (alone or in combination with the wireless communications interface(s) 302 and network communications interface(s) 303) to carry out various functions described herein. In particular, the program code 305, wireless communications interfaces 302, and network communications interfaces 303 may operate cooperatively to carry out one or more aspects of the latency-based contention free preamble reuse methods described herein.

It will be appreciated that there can be numerous specific implementations of a base station, such as base station 301, in which latency-based contention free preamble reuse could be implemented. As such, base station 301 is representative of a means for carrying out latency-based contention free preamble reuse, in accordance with the methods and steps described herein by way of example.

Figure 3B:
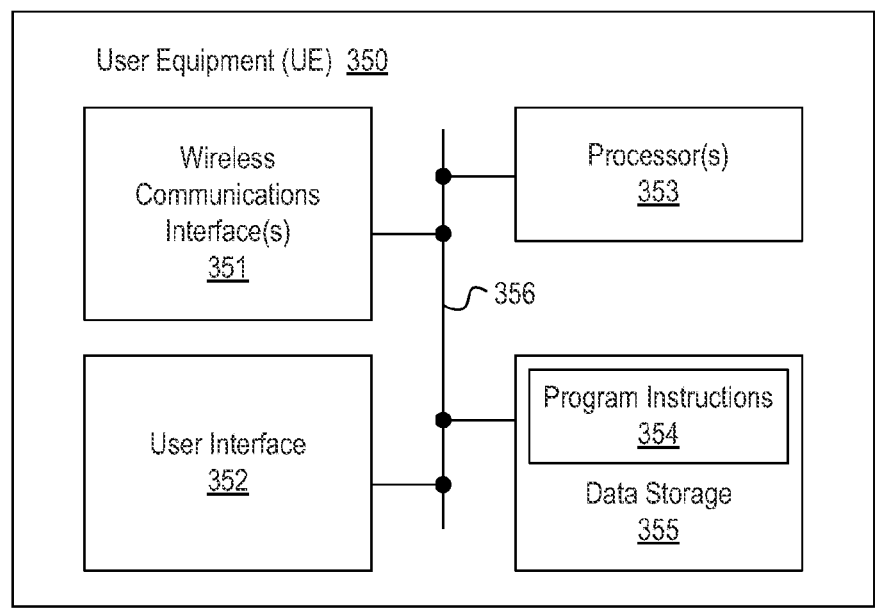
FIG. 3B is a simplified block diagram of an example UE according to some embodiments of the disclosed systems and methods.

FIG. 3B is a simplified block diagram of a UE 350 according to some embodiments of the disclosed systems and methods, including, for example, UEs 120-123 shown in FIGS. 1 and 2. The UE 350 is configured to operate in a communication system, such as the wireless communication system 100 of FIG. 1 for example, and may execute one or more functions described herein.

The UE 350 includes one or more wireless communication interfaces 351, one or more processors 353, a user interface 352, and non-transitory data storage 355 configured to store program instructions 354, all of which may be communicatively linked together by a system bus 356 or other similar mechanism. Variations from this arrangement are possible as well, including addition and/or omission of components, combination of components, and distribution of components in any of a variety of ways.

Wireless communication interface(s) 351 includes components (e.g., radios, antennas, communications processors) configured to engage in air interface communication with a base station. For example, the wireless communication interface 351 may include one or more antenna structures and chipsets arranged to support wireless communication according to one or more air interface protocols, such as the ones described herein (e.g., CDMA, GSM, LTE, etc.) and perhaps others (e.g., WiFi, Bluetooth, etc.).

The one or more processors 351 include one or more general purpose processors (e.g., microprocessors) and/or special purpose processors (e.g., application specific integrated circuits or the like). In some embodiments, the one or more processors 351 may be integrated in whole or in part with the one or more wireless communication interfaces 351.

The non-transitory data storage 355 comprises one or more volatile and/or non-volatile storage components. The storage components may include one or more magnetic, optical, and/or flash memory components for example. In some embodiments, the non-transitory data storage 355 may be integrated in whole or in part with the one or more processors 353 and/or the wireless communication interface(s) 351. Additionally or alternatively, the non-transitory data storage 355 may be provided separately as a non-transitory machine readable medium.

The non-transitory data storage 355 may hold (e.g., contain, store, or otherwise be encoded with) program instructions 354 (e.g., machine language instructions or other program logic, markup or the like) executable by the one or more processors 353 to carry out the various functions described herein. The non-transitory data storage 355 may also hold reference data for use in carrying out various functions described herein, such as one or more lists of coverage areas, available frequency bands, available carrier frequencies (e.g., Preferred Roaming List, etc.), and available contention free and non contention free preambles.

It will be appreciated that there can be numerous specific implementations of a UE, such as UE 350, in which latency-based contention free preamble reuse could be implemented. As such, UE 350 is representative of a means for carrying out latency-based contention free preamble reuse, in accordance with the methods and steps described herein by way of example.

Figure 4:
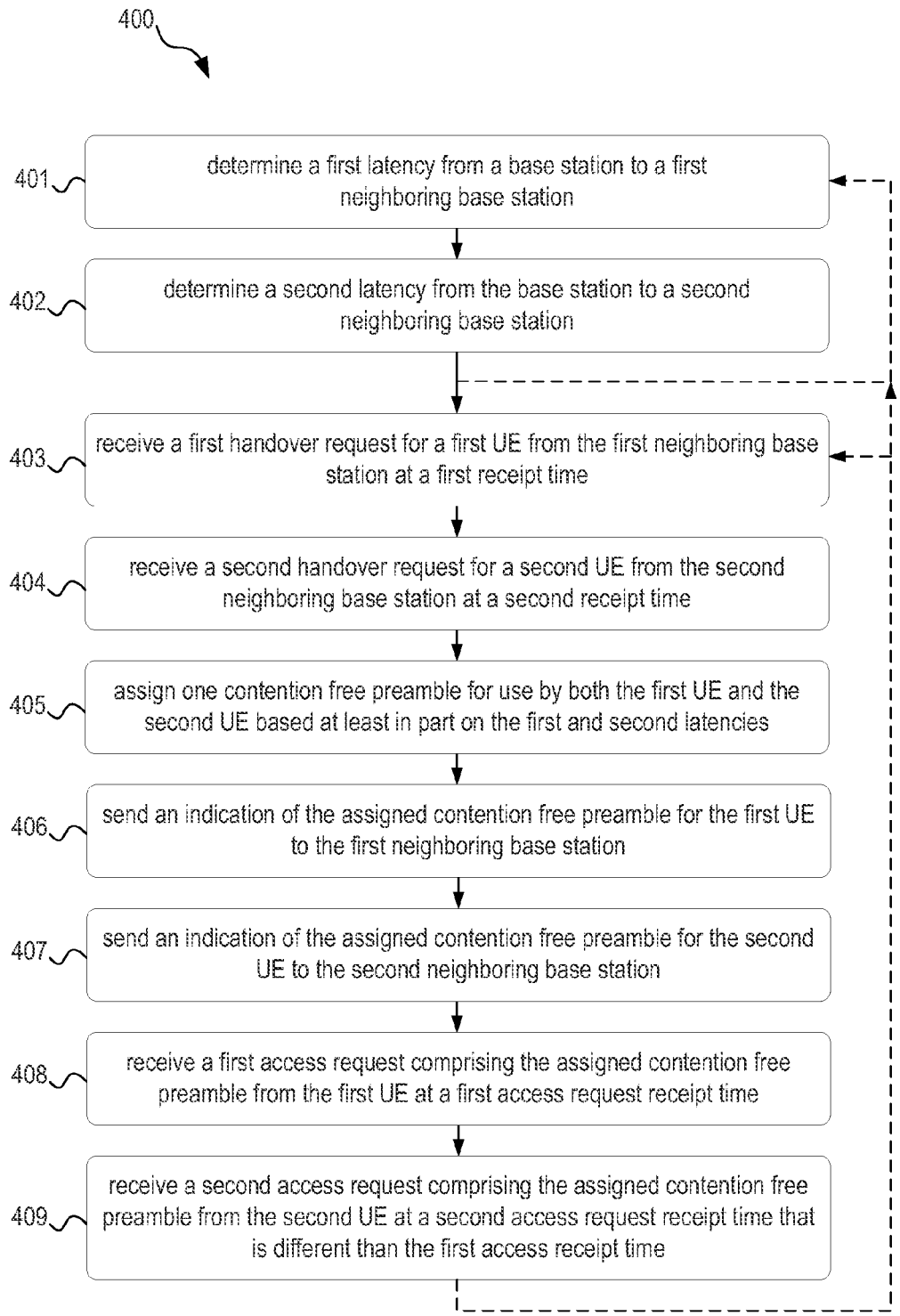
FIG. 4 is a method flow chart depicting aspects of some embodiments of the disclosed systems and methods.

FIG. 4 is a flow chart of a method 400 depicting aspects of some embodiments of the disclosed systems and methods.

Method 400 begins at block 401, where a base station determines a first latency from the base station to a first neighboring base station. At block 402, the base station determines a second latency from the base station to a second neighboring base station. In operation, the base station and the neighboring base stations may be the same as or similar to any of the base stations described herein. In some embodiments, the determination of the first and second latencies is performed as part of determining a respective latency from the base station to each neighboring base station of a plurality of neighboring base stations, as described herein with respect to FIGS. 1 and 2. In operation, the base station may determine the first and second latencies according to any of the latency determination methods described herein, e.g., via one-way transmission time, round-trip transmission time, or any other latency determination method now known or later developed.

Some embodiments may additionally or alternatively include the base station selecting a pair of neighboring base stations from the plurality of neighboring base stations as the first and second neighboring base stations with which the base station will implement one or more aspects of the latency-based contention free preamble reuse methods described herein. However, an explicit selection of a particular pair of neighboring base stations as the first and second base station is not necessary in all embodiments.

In some embodiments, the base station may continually, or at least periodically, determine the first and second latencies. For example, in some embodiments, the base station may maintain a latency table (or similar mechanism) that includes corresponding latencies for each of its neighboring base stations, including but not limited to the first and second base stations, as described herein with respect to FIGS. 1 and 2. The continual (or least periodic) aspect of the base station's latency-determination function is indicated in example method 400 by the dotted line that returns to block 401 after block 402.

At block 403, the base station receives a first handover request for a first UE from the first neighboring base station at a first receipt time, and at block 404, the base station receives a second handover request for a second UE from the second neighboring base station at a second receipt time. In some instances, the first and second receipt times may correspond to the same point in time, i.e., the base station may receive the first and second handover requests for the first and second UEs from the first and second neighboring base stations, respectively, at the same time or at substantially the same time. In other instances, however, the first and second receipt times may correspond to different points in time. In operation, the first and second handover requests are the same as or similar to the handover requests described herein with respect to FIGS. 1 and 2.

At block 405, the base station assigns one contention free preamble for use by both the first UE and the second UE based at least in part on the first and second latencies corresponding to the first and second neighboring base stations. In operation, the base station may assign the same contention free preamble for use by both the first and second UEs based on the first and second latencies according to any of the methods disclosed and described herein with respect to FIGS. 1 and 2. For example, in some embodiments, the base station's assignment of the same contention free preamble for use by two different UEs may depend on one or both of: (i) whether the first and second latencies differ by more than a latency difference threshold, (ii) whether the time between the base station's receipt of the first and second handover requests from the first and second neighboring base stations, respectively (i.e., the receipt time difference), is less than the difference between the first and second latencies.

At block 406, the base station sends an indication of the assigned contention free preamble (or perhaps the actual contention free preamble) for the first UE to the first neighboring base station, and at block 407, the base station sends an indication of the assigned contention free preamble (or perhaps the actual contention free preamble) for the second UE to the second neighboring base station. In operation, the first and second neighboring base stations in turn instruct the first and second UEs, respectively, to send their corresponding access requests to the base station.

At block 408, the base station receives a first access request comprising the assigned contention free preamble from the first UE at a first access request receipt time, and at block 409, the base station receives a second access request comprising the assigned contention free preamble from the second UE at a second access request time. In operation, the first access request receipt time is different than the second access request receipt time.

After receiving the first and second access requests, the method 400 returns either to block 403 to receive more handover requests and/or back to block 401 to update the latency determinations for the neighboring nodes, as indicated by the dotted line connecting block 409 to blocks 403 and 401.

While various aspects have been disclosed herein, other aspects will be apparent to those of skill in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting. For example, while the disclosed embodiments focus on LTE-based implementations, the disclosed systems and methods are equally applicable to any other protocol that is able to implement latency-based contention free preamble reuse according to the systems and methods described herein.

What is claimed is:

1. A method comprising:
   determining a first latency from a base station to a first neighboring base station;
   determining a second latency from the base station to a second neighboring base station; and
   assigning one contention free preamble for use by both a first UE served by the first neighboring base station and a second UE served by the second neighboring base station based at least in part on the first and second latencies.

2. The method of claim 1, wherein assigning the one contention free preamble for use by both a first UE served by the first neighboring base station and a second UE served by the second neighboring base station based at least in part on the first and second latencies comprises:
   determining whether the first and second latencies differ by more than a latency difference threshold; and
   assigning the one contention free preamble for use by both the first and second UEs at least partly in response to determining that the first and second latencies differ by more than the latency difference threshold.

3. The method of claim 1, wherein assigning the one contention free preamble for use by both a first UE served by the first neighboring base station and a second UE served by the second neighboring base station based at least in part on the first and second latencies comprises:
   determining a latency difference between the first latency and the second latency;
   receiving a first handover request for the first UE from the first neighboring base station at a first receipt time;
   receiving a second handover request for the second UE from the second neighboring base station at a second receipt time;
   determining a receipt time difference between the first receipt time and the second receipt time; and
   assigning the one contention free preamble for use by both the first and second UEs at least partly in response to determining that the receipt time difference is less than the latency difference.

4. The method of claim 1, wherein assigning the one contention free preamble for use by both a first UE served by the first neighboring base station and a second UE served by the second neighboring base station based at least in part on the first and second latencies comprises:
   receiving a first handover request for the first UE from the first neighboring base station at a first receipt time;
   receiving a second handover request for the second UE from the second neighboring base station at a second receipt time; and
   assigning the one contention free preamble for use by both the first and second UEs at least partly in response to determining that the difference between the first and second receipt times is less than a receipt difference threshold.

5. The method of claim 1, wherein the base station is configured to communicate with a plurality of neighboring base stations comprising the first neighboring base station and the second neighboring base station, and wherein the method further comprises:

determining a respective latency from the base station to each neighboring base station of the plurality of neighboring base stations; and based on the respective latencies, selecting, from the plurality of neighboring base stations, a pair of neighboring base stations as the first and second neighboring base stations.

6. The method of claim 1, wherein the first latency is based on a round-trip transmission time between the base station and the first neighboring base station, and wherein the second latency is based on a round-trip transmission time between the base station and the second neighboring base station.

7. The method of claim 1, wherein the first latency is based on a one-way transmission time from the base station to the first neighboring base station, and wherein the second latency is based on a one-way transmission time from the base station to the second neighboring base station.

8. The method of claim 1, further comprising:
sending an indication of the one assigned contention free preamble for the first UE from the base station to the first neighboring base station; and
sending an indication of the one assigned contention free preamble for the second UE from the base station to the second neighboring base station.

9. The method of claim 1, further comprising:
receiving a first access request comprising the one assigned contention free preamble from the first UE at a first access request receipt time; and
receiving a second access request comprising the one assigned contention free preamble from the second UE at a second access request receipt time that is different than the first access request receipt time.

10. The method of claim 1, wherein the base station and the first and second neighboring base stations are LTE eNodeB base stations.

11. A base station comprising:
a first communications interface configured to send and receive signaling messages to and from a first neighboring base station;
a second communications interface configured to send and receive signaling messages to and from a second neighboring base station; and
one or more processors configured to: (i) determine a first latency from the base station to the first neighboring base station; (ii) determine a second latency from the base station to the second neighboring base station; and (iii) assign one contention free preamble for use by both a first UE served by the first neighboring base station and a second UE served by the second neighboring base station based at least in part on the first and second latencies.

12. The base station of claim 11, wherein the one or more processors are further configured to: (i) determine whether the first and second latencies differ by more than a latency difference threshold; and (ii) assign the one contention free preamble for use by both the first and second UEs at least partly in response to determining that the first and second latencies differ by more than the latency difference threshold.

13. The base station of claim 11, wherein the first communications interface is further configured to receive a first handover request for the first UE from the first neighboring base station at a first receipt time, wherein the second communications interface is further configured to receive a second handover request for the second UE from the second neighboring base station at a second receipt time, and wherein the one or more processors are further configured to: (i) determine a latency difference between the first latency and the second latency; (ii) determine a receipt time difference between the first receipt time and the second receipt time; and (iii) assign the one contention free preamble for use by both the first and second UEs at least partly in response to determining that the receipt time difference is less than the latency difference.

14. The base station of claim 11, wherein the first communications interface is further configured to receive a first handover request for the first UE from the first neighboring base station at a first receipt time, wherein the second communications interface is further configured to receive a second handover request for the second UE from the second neighboring base station at a second receipt time, and wherein the one or more processors are further configured to: (i) determine a receipt time difference between the first receipt time and the second receipt time; and (ii) assign the one contention free preamble for use by both the first and second UEs at least partly in response to determining that the difference between the first and second receipt times is less than a receipt difference threshold.

15. The base station of claim 11, wherein the base station is configured to communicate with a plurality of neighboring base stations comprising the first neighboring base station and the second neighboring base station, and wherein the one or more processors are further configured to: (i) determine a respective latency from the base station to each neighboring base station of the plurality of neighboring base stations; and (ii) based on the respective latencies, select, from the plurality of neighboring base stations, a pair of neighboring base stations as the first and second neighboring base stations.

16. The base station of claim 11, wherein the first latency is based on one of (i) a round-trip transmission time between the base station and the first neighboring base station or (ii) a one-way transmission time from the base station to the first neighboring base station; and wherein the second latency is based on one of (i) a round-trip transmission time between the base station and the second neighboring base station or (ii) a one-way transmission time from the base station to the second neighboring base station.

17. The base station of claim 11, wherein the base station is further configured to (i) send an indication of the one assigned contention free preamble for the first UE to the first neighboring base station, and (ii) send an indication of the one assigned contention free preamble for the second UE to the second neighboring base station.

18. The base station of claim 11, wherein the base station and the first and second neighboring base stations are LTE eNodeB base stations.

19. A tangible, non-transitory computer readable medium having instructions stored thereon that, upon execution by one or more processors of a base station, cause the base station to perform functions comprising:
determining a first latency from the base station to a first neighboring base station;
determining a second latency from the base station to a second neighboring base station; and
assigning one contention free preamble for use by both a first UE served by the first neighboring base station and a second UE served by the second neighboring base station based at least in part on the first and second latencies.

20. The tangible, non-transitory computer readable medium of claim 19, wherein the stored instructions, when executed by one or more processors of the base station, cause the base station to perform additional functions comprising:
determining whether the first and second latencies differ by more than a latency difference threshold; and assigning the one contention free preamble for use by both the first and second UEs at least partly in response to determining that the first and second latencies differ by more than the latency difference threshold.

* * * * *